US009128358B2

(12) United States Patent
Kubota

(10) Patent No.: US 9,128,358 B2
(45) Date of Patent: Sep. 8, 2015

(54) PROJECTOR AND PROJECTOR SYSTEM

(71) Applicant: Seiko Epson Corporation, Tokyo (JP)

(72) Inventor: Shinji Kubota, Ina (JP)

(73) Assignee: Seiko Epson Corporation, Tokyo (JP)

( * ) Notice: Subject to any disclaimer, the term of this patent is extended or adjusted under 35 U.S.C. 154(b) by 248 days.

(21) Appl. No.: 13/787,477

(22) Filed: Mar. 6, 2013

(65) Prior Publication Data

US 2013/0250251 A1  Sep. 26, 2013

(30) Foreign Application Priority Data

Mar. 21, 2012 (JP) ................................. 2012-063244
Dec. 20, 2012 (JP) ................................. 2012-277751

(51) Int. Cl.
*G03B 21/14* (2006.01)
*H04N 9/31* (2006.01)
*H04N 13/04* (2006.01)
*G03B 21/16* (2006.01)
*G06F 3/14* (2006.01)

(52) U.S. Cl.
CPC ............. *G03B 21/14* (2013.01); *H04N 9/3147* (2013.01); *H04N 13/0459* (2013.01); *G03B 21/16* (2013.01); *G03B 2206/00* (2013.01); *G06F 3/1446* (2013.01); *G09G 2330/02* (2013.01); *G09G 2330/08* (2013.01)

(58) Field of Classification Search
CPC .................................. H04N 5/74; H04N 3/19

USPC .................................................... 353/94, 122
See application file for complete search history.

(56) References Cited

U.S. PATENT DOCUMENTS

2002/0159035 A1* 10/2002 Koyama et al. ................. 353/31
2007/0109504 A1*  5/2007 Miyazawa ....................... 353/67

FOREIGN PATENT DOCUMENTS

| JP | 11-252483 | A | 0/1909 | |
| JP | 10-049068 | A | 2/1998 | |
| JP | 11-252483 | * | 2/1998 | ............... H04N 5/74 |
| JP | 2011-133602 | A | 7/2011 | |

* cited by examiner

*Primary Examiner* — William C Dowling
*Assistant Examiner* — Jerry Brooks
(74) *Attorney, Agent, or Firm* — ALG Intellectual Property, LLC

(57) ABSTRACT

A second projector is configured to be able to connect with a first projector via a USB cable including a VBUS line. The second projector includes an image projecting unit that modulates light emitted from a light source and projects the light, a USB communication unit that detects, in a standby state, the supply of power via a VBUS from the first projector, and a control unit that performs control to switch an operating state of the second projector between the standby state and a normal operating state. When the supply of power of the VBUS is detected by the USB communication unit, the control unit activates the second projector from the standby state to the normal operating state.

9 Claims, 9 Drawing Sheets

| NUMBER | PIN NAME |
|---|---|
| 1 | VBUS |
| 2 | D- |
| 3 | D+ |
| 4 | GND |
FIG. 3A
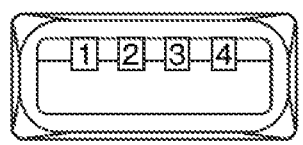
FIG. 3B
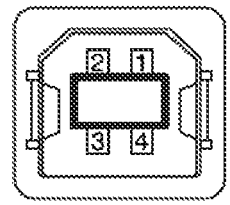
FIG. 3C

PROJECTOR AND PROJECTOR SYSTEM

BACKGROUND

1. Technical Field

The present invention relates to a projector, a projector system, and the like.

2. Related Art

In the related art, projector systems in which a plurality of projectors are combined to project images onto one screen have been proposed. In this type of projector system, projection images of the projectors can be displayed by superimposing the images on a screen, or projection images of the projectors can be displayed by arranging the images in a side-by-side fashion on a screen. Moreover, two projectors are combined and projection images of the projectors are projected as a right-eye image and a left-eye image, so that it is also possible to see a 3D image using polarized glasses.

For configuring the projector system described above, various techniques relating to projectors whose operations are mutually controlled to operate in conjunction with each other as one system have been proposed. For example, JP-A-10-49068 discloses a technique that allows liquid crystal projectors to share each other's memories to thereby achieve an effective use of the memories in the liquid crystal projectors and the simplification of cable connection.

However, in a projector system to which the technique disclosed in JP-A-10-49068 is applied, a plurality of projectors are operated in conjunction with each other with, for example, an interface conforming to the RS (Recommended Standard)-232C standard. Therefore, an RS-232C terminal that is used also for projector control from the outside is occupied, causing a problem in that projector control cannot be performed from the outside when the RS-232C terminal is used for operating the plurality of projectors in conjunction with each other.

Therefore, it is conceivable that a USB (Universal Serial Bus) cable is connected to a USB terminal that the projector includes in addition to the RS-232C terminal to thereby operate the plurality of projectors in conjunction with each other. However, when it is intended to operate the projectors in conjunction with each other by simply connecting the USB cable, the projector has to wait for, in a state where USB communication is possible, a power-on command from another connected projector, causing a problem in that standby power is increased.

SUMMARY

An advantage of some aspects of the invention is to solve at least a part of the problems described above and the invention can be implemented as the following modes or aspects.

(1) A first aspect of the invention is directed to a projector configured to be able to connect with another projector via a communication cable including a power line, including: an image projecting unit that modulates light emitted from a light source and projects the light; a power supply detecting unit that detects, in a standby state, the supply of power via the power line from the another projector; and a control unit that performs control to switch an operating state of the projector between the standby state and a normal operating state, wherein when the supply of power of the power line is detected by the power supply detecting unit, the control unit is activated from the standby state to the normal operating state.

In the aspect, in the standby state, when the supply of power via the power line from another projector connected via the communication cable including the power line is detected, the projector is activated from the standby state to the normal operating state. With this configuration, another projector can be activated in conjunction with the projector only with the communication cable. Accordingly, when a projector has a terminal for control, control of the projector can be performed via the terminal, and in addition, the power-on of the projector is linked with that of another projector, so that a projector system that is easy to use for the user can be provided. In this case, it is sufficient for the projector to wait in the standby state before activation. Therefore, there is no need to wait for a power-on command from another projector, which can considerably reduce standby power.

(2) A second aspect of the invention is directed to the projector according to the first aspect, wherein the projector further includes an input operating unit that accepts an input operation and a power source unit that supplies power to the power line, in the case where the operating mode of the projector is set to a first operating mode via the input operating unit, the control unit issues a light source turn-on command instructing to turn on a light source of the another projector via the communication cable after the power source unit supplies power to the power line.

In the aspect, the projector is configured to be able to set the operating mode. Then, when the operating mode is set to the first operating mode, the projector supplies power to the power line included in the communication cable and then issues a light source turn-on command instructing to turn on the light source of another projector via the communication cable, thereby notifying that the projector is powered on. With this configuration, one projector notifies the other projector of the power-on, whereby it is possible to provide a projector system in which a plurality of projectors are activated in conjunction with each other at low cost with low power consumption without occupying a terminal that the projectors each include for control.

(3) A third aspect of the invention is directed to the projector according to the second aspect, wherein in the case where the operating mode of the projector is set to a second operating mode via the input operating unit, the control unit is activated from the standby state to the normal operating state when the supply of power of the power line is detected by the power supply detecting unit.

According to the aspect, the projector is configured to be able to switch the operation between the first operating mode and the second operating mode. In the second operating mode, when the supply of power via the power line from another projector is detected, the projector is activated from the standby state to the normal operating state. With this configuration, it is possible, by preparing a plurality of projectors according to the aspect, to configure a projector system in which the operating mode of each of the projectors is appropriately set. As a result, it is possible to provide a projector system in which a plurality of projectors are activated in conjunction with each other at low cost with low power consumption without occupying a terminal that the projectors each include for control.

(4) A fourth aspect of the invention is directed to the projector according to any of the first to third aspects, wherein the control unit determines whether or not a connection destination of the communication cable is a projector when the supply of power of the power line is detected by the power supply detecting unit, and if the connection destination is determined as not a projector, the control unit switches the operating state from the normal operating state to the standby state.

According to the aspect, if the connection destination is determined as not a projector, the projector according to the aspect can return again to the standby state. This eliminates the case where the projector remains activated for a longtime as the normal operating state even when a proper operation cannot be expected as a projector system, so that unnecessary standby power of the projector can be reduced.

(5) A fifth aspect of the invention is directed to the projector according to the fourth aspect, wherein the projector further includes a light source control unit that controls the turn-on of the light source, and if the connection destination is determined as a projector, the control unit accepts a light source turn-on command from the another projector and initiates the turn-on of the light source with the light source control unit.

According to the aspect, when the connection destination is determined as not a projector and the projector returns to the standby state, it is possible to avoid a situation where unnecessary power is consumed or unnecessary control is performed such as turning off the light source again. Moreover, it is also possible to avoid a situation where the user feels uneasy because the turn-on and turn-off of the light source are successively performed.

(6) A sixth aspect of the invention is directed to the projector according to the fourth or fifth aspect, wherein the projector further includes a cooling fan that cools the image projecting unit and a cooling control unit that controls the operation of the cooling fan, and if the connection destination is determined as a projector, the control unit starts the rotation of the cooling fan with the cooling control unit.

According to the aspect, when the connection destination is determined as not a projector and the projector returns to the standby state, it is possible to avoid a situation where unnecessary power is consumed or unnecessary control is performed such as stopping the cooling fan again. Moreover, it is also possible to avoid a situation where the user feels uneasy because the start and stop of the cooling fan are successively performed.

(7) A seventh aspect of the invention is directed to the projector according to any of the first to sixth aspects, wherein the communication cable is a USB cable, and the power line is a USB standard VBUS.

According to the aspect, a plurality of projectors can be activated in conjunction with each other with low power consumption using a USB cable.

(8) An eighth aspect of the invention is directed to a projector configured to be able to connect with another projector via a communication cable including a power line, including: an image projecting unit that modulates light emitted from a light source and projects the light; and a power source unit that supplies power to the power line, wherein power is supplied to the power line to thereby notify the another projector that the projector is powered on.

According to the aspect, power is supplied to the power line included in the communication cable to thereby notify the another projector that the projector is powered on. With this configuration, it is possible to provide a projector system in which a plurality of projectors are activated in conjunction with each other with low power consumption without occupying a terminal that the projectors each include for control.

(9) A ninth aspect of the invention is directed to the projector according to the eighth aspect, wherein the projector further includes a control unit that issues, to the another projector activated by detecting the supply of power to the power line, a light source turn-on command instructing to turn on a light source of the another projector via the communication cable.

According to the aspect, after supplying power to the power line included in the communication cable, a light source turn-on command instructing to turn on a light source of another projector is issued via the communication cable, so that the power-on of the projector can be notified. With this configuration, it is possible to provide a projector system in which a plurality of projectors are activated in conjunction with each other with low power consumption without occupying a terminal that the projectors each include for control.

(10) A tenth aspect of the invention is directed to the projector according to the eighth or ninth aspect, wherein the communication cable is a USB cable, and the power line is a USB standard VBUS.

According to the aspect, a plurality of projectors can be activated in conjunction with each other with low power consumption using a USB cable.

(11) An eleventh aspect of the invention is directed to a projector system including a first projector and a second projector that are connected via a communication cable including a power line, wherein the first projector is the projector according to any of the eighth to tenth aspects; and the second projector is the projector according to any of the first to seventh aspects.

According to the aspect, it is possible to provide the projector system in which the first projector and the second projector can be powered on in conjunction with each other with low power consumption without adding a terminal.

BRIEF DESCRIPTION OF THE DRAWINGS

The invention will be described with reference to the accompanying drawings, wherein like numbers reference like elements.

FIG. 3A is an explanatory diagram of pins of a USB terminal; FIG. 3B is an explanatory diagram of an A plug of a USB cable connected to an A terminal conforming to the USB standard; and FIG. 3C is an explanatory diagram of a B plug of the USB cable connected to a B terminal conforming to the USB standard.

DESCRIPTION OF EXEMPLARY EMBODIMENTS

Hereinafter, an embodiment of the invention will be described in detail with reference to the drawings. The embodiment described below does not unduly limit the contents of the invention set forth in the appended claims. Moreover, not all of the configurations described below are indispensable constituent features for solving the problems of the invention.

Projector System

Figure 1:
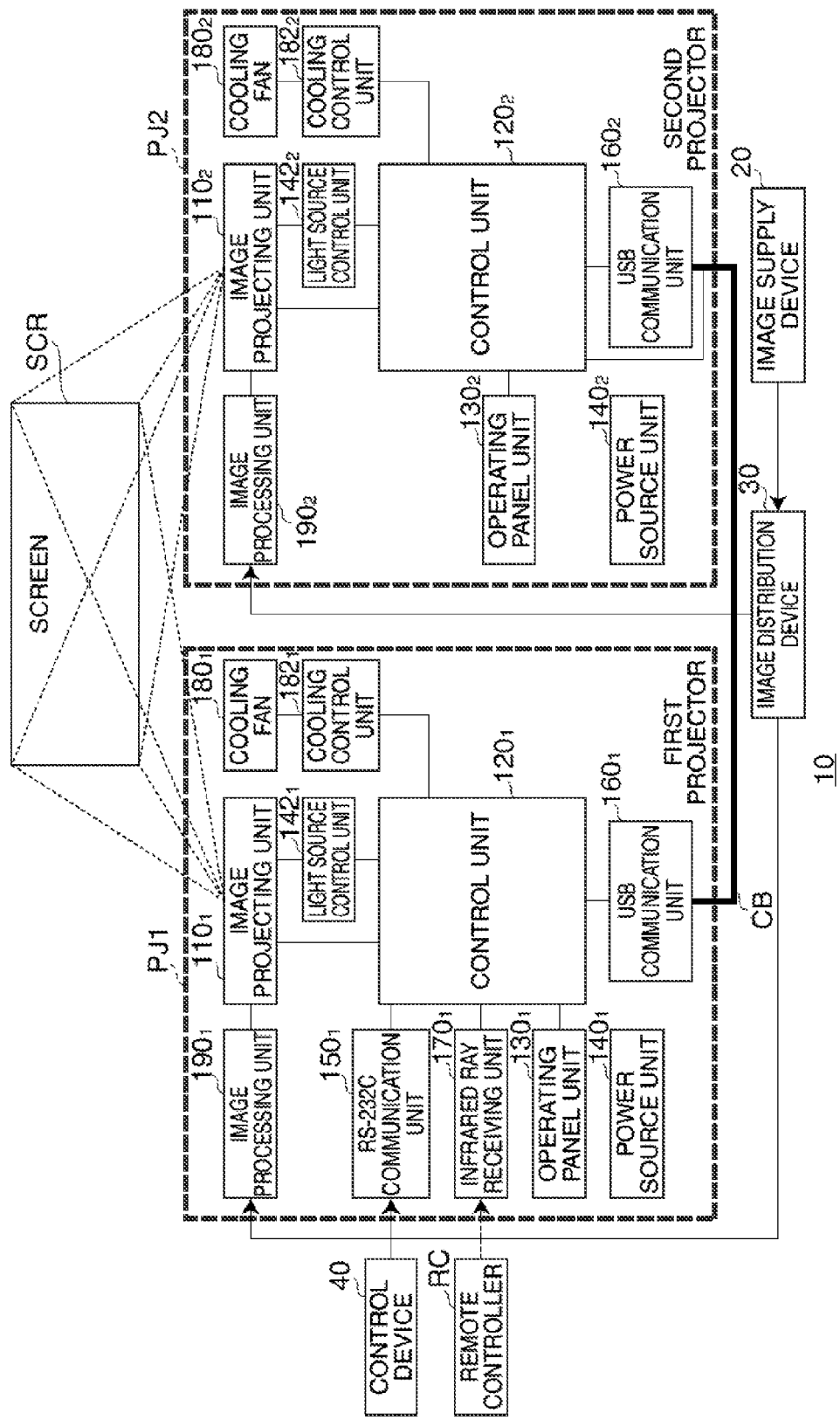
FIG. 1 is a block diagram of a configuration example of a projector system according to an embodiment of the invention.

FIG. 1 shows a block diagram of a configuration example of a projector system according to an embodiment of the invention. FIG. 1 represents an example in which the projector system including two projectors displays projection images of the projectors by superimposing the images on a screen.

The projector system 10 in the embodiment includes a first projector PJ1, a second projector PJ2, an image supply device 20, an image distribution device 30, and a control device 40. In the projector system 10, the first projector PJ1 and the second projector PJ2 are connected via a USB cable CB as a communication cable, so that respective projection images can be displayed by superimposing on each other on a screen SCR. In the embodiment, the first projector PJ1 operates as a master (a master projector), while the second projector PJ2 operates as a follower (a follower projector). In this case, when the first projector PJ1 as a master projector is activated from a standby state, the second projector PJ2 as a follower projector is also activated from the standby state in conjunction with the activation of the first projector PJ1.

The image supply device 20 generates an image to be projected onto the screen SCR by the first projector PJ1 and the second projector PJ2, and supplies image data corresponding to the generated image to the image distribution device 30. The function of the image supply device 20 described above can be realized by, for example, a personal computer (hereinafter PC), a video reproduction device such as a DVD (Digital Versatile Disc) player, or the like.

The image distribution device 30 generates image data for the first projector PJ1 and image data for the second projector PJ2 from the image data supplied from the image supply device 20, and distributes the respective generated image data to the respective corresponding projectors (PJ1 and PJ2). The function of the image distribution device 30 described above can be realized by, for example, a PC.

The control device 40 is connected to an RS-232C terminal (not shown) for control of the first projector PJ1. The control device 40 controls the first projector PJ1 to thereby control the second projector PJ2 that operates in conjunction with the first projector PJ1. For example, the control device 40 may be connected to an RS-232C terminal (not shown) for control of the second projector PJ2, so that the control device 40 may control the second projector PJ2 via the terminal. Moreover, the second projector PJ2 may be controlled through USB communication described later from the first projector PJ1 controlled by the control device 40. The function of the control device 40 described above can be realized by, for example, a PC.

The first projector PJ1 includes an image projecting unit $110_1$, a control unit $120_1$, an operating panel unit $130_1$, a power source unit $140_1$, a light source control unit $142_1$, an RS-232C communication unit $150_1$, a USB communication unit $160_1$, and an infrared ray receiving unit $170_1$. Further, the first projector PJ1 includes a cooling fan $180_1$, a cooling control unit $182_1$, and an image processing unit $190_1$.

The image projecting unit $110_1$ has a light source (not shown). The image projecting unit $110_1$ modulates, based on image data on which image processing has been performed by the image processing unit $190_1$, light emitted from the light source and projects an image onto the screen SCR.

The control unit $120_1$ includes a central processing unit (hereinafter CPU) and a memory, and operates according to a program stored in the memory to thereby control the first projector PJ1.

The operating panel unit $130_1$ accepts a user's input operation on the first projector PJ1.

The power source unit $140_1$ converts a voltage supplied from an external power supply into a predetermined voltage, and supplies electric power to the units of the first projector PJ1.

The control unit $120_1$ can control the power source unit $140_1$ or the units as supply destinations of electric power to thereby stop the supply of electric power to a predetermined block of the first projector PJ1 depending on whether the first projector PJ1 is in a normal operating state or the standby state.

The light source control unit $142_1$ controls the turn-on of the light source of the image projecting unit $110_1$.

The RS-232C communication unit $150_1$ performs communication control conforming to the RS-232C standard with the control device 40 connected via an RS-232C terminal (not shown).

The first projector PJ1 has a USB standard A terminal (in a broad sense, a USB terminal) (not shown). The USB communication unit $160_1$ performs communication control conforming to the USB standard with the second projector PJ2 via the USB cable CB connected to the A terminal.

The infrared ray receiving unit $170_1$ receives, according to the content of a user's operation, a code sent from a remote controller RC with an infrared ray.

The cooling fan $180_1$ cools the image projecting unit $110_1$.

The cooling control unit $182_1$ controls the rotation of the cooling fan $180_1$.

The image processing unit $190_1$ performs given image processing on image data for the first projector PJ1 supplied from the image distribution device 30, and supplies the image data on which the image processing has been performed to the image projecting unit $110_1$.

The second projector PJ2 includes an image projecting unit $110_2$, a control unit $120_2$, an operating panel unit $130_2$, a power source unit $140_2$, a light source control unit $142_2$, and a USB communication unit $160_2$. Further, the second projector PJ2 includes a cooling fan $180_2$, a cooling control unit $182_2$, and an image processing unit $190_2$.

Similarly to the image projecting unit $110_1$, the image projecting unit $110_2$ has a light source (not shown). The image projecting unit $110_2$ modulates, based on image data on which image processing has been performed by the image processing unit $190_2$, light emitted from the light source and projects an image onto the screen SCR.

Similarly to the control unit $120_1$, the control unit $120_2$ includes a CPU and a memory, and operates according to a program stored in the memory to thereby control the second projector PJ2.

The operating panel unit $130_2$ accepts a user's input operation on the second projector PJ2.

Similarly to the power source unit $140_1$, the power source unit $140_2$ converts a voltage supplied from an external power supply into a predetermined voltage, and supplies electric power to the units of the second projector PJ2.

The control unit $120_2$ can control the power source unit $140_2$ or the units as supply destinations of electric power to thereby stop the supply of electric power to a predetermined block of the second projector PJ2 depending on whether the second projector PJ2 is in the normal operating state or the standby state.

The light source control unit $142_2$ controls the turn-on of the light source of the image projecting unit $110_2$.

The second projector PJ2 has a USB standard B terminal (in a broad sense, a USB terminal) (now shown). The USB communication unit $160_2$ performs communication control conforming to the USB standard with the first projector PJ1 via the USB cable CB connected to the B terminal.

The cooling fan $180_2$ cools the image projecting unit $110_2$.

The cooling control unit $182_2$ controls the rotation of the cooling fan $180_2$.

The image processing unit $190_2$ performs given image processing on image data for the second projector PJ2 supplied from the image distribution device 30, and supplies the image data on which the image processing has been performed to the image projecting unit $110_2$.

In the projector system 10 having the configuration described above, the first projector PJ1 and the second projector PJ2 mutually wait in the standby state when they are set to operate in a power link mode. In this state, when, for example, the user operates the remote controller RC to instruct to power on and a code corresponding to the operation is received in the infrared ray receiving unit $170_1$, the first projector PJ1 is activated from the standby state to the normal operating state. Then, the USB communication unit $160_1$ starts supplying a predetermined voltage from the power source unit $140_1$ to a VBUS of the USB terminal. The voltage of the VBUS is transmitted via a VBUS line (power line) of the USB cable CB to a VBUS of the second projector PJ2.

In the second projector PJ2, the VBUS of the USB terminal is also connected to the control unit $120_2$, so that the control unit $120_2$ can detect the application of voltage of the VBUS even in a state where the supply of power of the USB communication unit $160_2$ is stopped. When the predetermined voltage is supplied to the VBUS, the second projector PJ2 in the standby state can detect the supply of the voltage as the supply of power via the VBUS line. Then, the second projector PJ2 is activated from the standby state to the normal operating state. That is, when the power-on of the first projector PJ1 as a master projector is linked with the second projector PJ2 as a follower projector, the link can be made using the supply of voltage to the VBUS as a trigger.

Recently, the USB terminal described above has already been used in many projectors. For example, to a USB standard A terminal, a USB memory is connected, so that an image or a moving image is displayed by a projector based on image information or moving image information stored in the USB memory, or a USB document camera is connected. Moreover, to a USB standard B terminal, a PC is connected, so that a mouse cursor on a screen of the PC is moved by a remote controller of a projector, or the screen of the PC is displayed by the projector.

In recent years, however, strict standards for standby power in standby of projectors have come into force. When projectors cannot pass the standards, the sale of the projectors is not allowed. Therefore, it is also necessary to stop the supply of power to the USB communication unit whenever possible. Then, since some users desire the power-on of a plurality of projectors to be linked while others do not, it is necessary to provide a projector that consumes low power in the standby state while achieving low cost without increasing a dedicated terminal. However, even when the projectors are linked using an RS-232C terminal that the projectors each include for control, low power consumption can be achieved but external control cannot be performed.

In this regard, according to the embodiment, the projectors can be activated in conjunction with each other in the projector system without using the RS-232C terminal that the projectors each include for control. Accordingly, in the projector system in the embodiment, control of each of the projectors can be performed via the RS-232C terminal, and in addition, the power-on of the projector is linked with that of another projector, so that a projector system that is easy to use for the user can be provided.

Projector

It is desirable that the function of each of the first projector PJ1 and the second projector PJ2 shown in FIG. 1 is realized by a projector having the following configuration. With this configuration, it is possible to provide the projector system described above at low cost.

Figure 2:
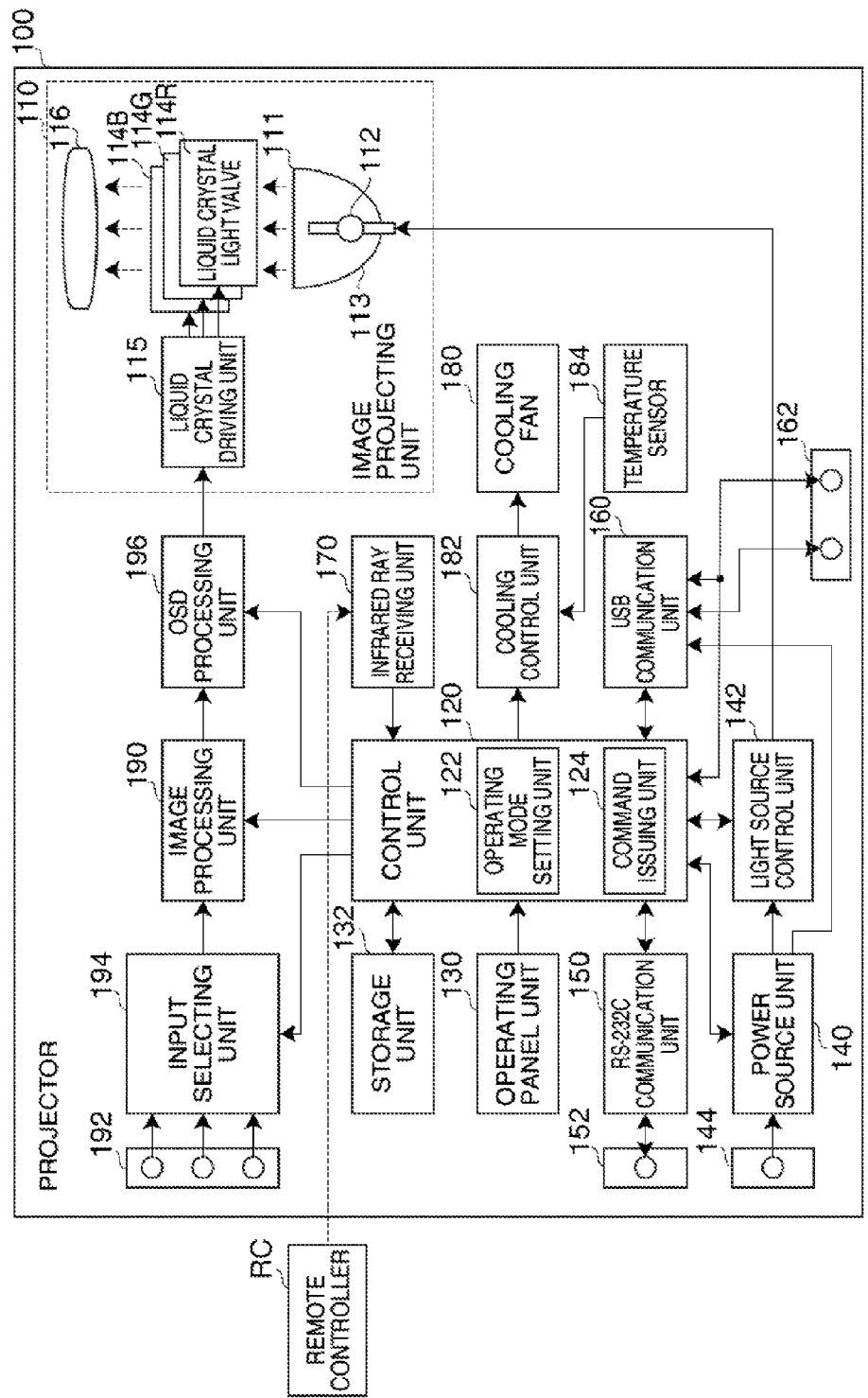
FIG. 2 is a block diagram of a detailed configuration example of a projector constituting the projector system in the embodiment.

FIG. 2 shows a block diagram of a detailed configuration example of a projector constituting the projector system in the embodiment.

FIGS. 3A to 3C show explanatory diagrams of the USB cable CB connected to a USB terminal of the projector in the embodiment. FIG. 3A represents an explanatory diagram of pins of the USB terminal. FIG. 3B represents an explanatory diagram of an A plug of the USB cable CB connected to an A terminal conforming to the USB standard. FIG. 3C represents an explanatory diagram of a B plug of the USB cable CB connected to a B terminal conforming to the USB standard.

The projector 100 in the embodiment is configured such that operation can be switched between that of a master projector and that of a follower projector by setting the operating mode. The projector 100 includes an image projecting unit 110, a control unit 120, an operating panel unit 130, a storage unit 132, a power source unit 140, a light source control unit 142, a power supply terminal 144, an RS-232C communication unit 150, and an RS-232C terminal 152. Further, the projector 100 includes a USB communication unit 160, a USB terminal 162, an infrared ray receiving unit 170, a cooling fan 180, a cooling control unit 182, and a temperature sensor 184. Still further, the projector 100 includes an image processing unit 190, an image data input terminal 192, an input selecting unit 194, and an OSD (On-Screen Display) processing unit 196. The units described above are accommodated in the main body of the projector 100 or on the outer surface of the main body. In addition to the units described above, the remote controller RC for operating the projector 100 is disposed.

The image projecting unit 110 includes a light source 111, liquid crystal light valves 114R, 114G, and 114B as a light modulating device, a liquid crystal driving unit 115, and a projection lens 116 as a projection optical system. The image projecting unit 110 modulates, with the liquid crystal light valves 114R, 114G, and 114B, light emitted from the light source 111 to form an image, and projects the image from the projection lens 116. The image projecting unit 110 realizes the function of the image projecting units $110_1$ and $110_2$ of FIG. 1.

The light source 111 includes a discharge-type light source lamp 112 formed of an extra-high-pressure mercury lamp, a metal halide lamp, or the like and a reflector 113 that reflects light emitted by the light source lamp 112 to the liquid crystal light valves 114R, 114G, and 114B side. Light emitted from the light source 111 is converted by an integrator optical system (not shown) into light whose brightness distribution is substantially uniform, and separated by a color separation optical system (not shown) into lights of respective color light components of red (R), green (G), and blue (B) as three primary colors of light. The separated lights of the respective color light components are incident on the corresponding liquid crystal light valves 114R, 114G, and 114B.

The liquid crystal light valves 114R, 114G, and 114B each include a liquid crystal panel or the like having liquid crystal sealed between a pair of transparent substrates. In each of the liquid crystal light valves 114R, 114G, and 114B, a plurality of pixels arranged in a matrix are formed, and a driving voltage can be applied to the liquid crystal pixel by pixel. When the liquid crystal driving unit 115 applies a driving voltage according to input image data to each of the pixels, the light transmittance of each of the pixels is set to that according to the image data. Therefore, the light emitted from the light source 111 is modulated by transmitting through the liquid crystal light valves 114R, 114G, and 114B, so that an image according to the image data is formed for each of the color lights. The formed images of the respective colors are combined pixel by pixel by a color combining optical system (not shown) to be a color image, and then the color image is enlarged and projected from the projection lens 116.

The control unit 120 includes an operating mode setting unit 122 and a command issuing unit 124. The control unit 120 includes a CPU and a random access memory (hereinafter RAM) used for temporary storage of various kinds of data or the like. The control unit 120 operates according to a control program stored in the storage unit 132 to thereby realize the functions of the units described above, and controls the operation of the projector 100. The control unit 120 realizes the function of the control units $120_1$ and $120_2$ of FIG. 1 according to the operating mode set by the operating mode setting unit 122.

The operating mode setting unit 122 sets the operating mode of the projector 100 by an instruction from the user via the operating panel unit 130 or the remote controller RC. The control unit 120 controls the units of the projector 100 according to the operating mode set by the operating mode setting unit 122. In the embodiment, the operating mode of the projector 100 includes a normal mode and the power link mode. The normal mode is an operating mode in which the projector 100 can operate alone. The power link mode is a mode in which the power-on of a follower projector is linked with the power-on of a projector set as a master projector.

When the operating mode is set to the power link mode, the operating mode setting unit 122 further sets, by the instruction from the user, a projector as a setting target to be a master projector or a follower projector. When the projector as a setting target is set to be a master projector, the control unit 120 controls the projector 100 as a master projector in the power link mode. When the projector as a setting target is set to be a follower projector, the control unit 120 controls the projector 100 as a follower projector in the power link mode.

The command issuing unit 124 issues a predetermined command to the other projector when the power link mode is set. For example, a projector set as a master projector issues, after activation, a predetermined command such as a light source turn-on command to a projector set as a follower projector.

The storage unit 132 includes a read only memory (ROM) and a non-volatile memory such as a flash memory or a ferroelectric random access memory (FeRAM). In the storage unit 132, a control program for controlling the operation of the projector 100, various kinds of setting data that specify the operating conditions or the like of the projector 100, and the like are stored.

The operating panel unit 130 accepts an input operation from the user and includes a plurality of operating keys for the user to perform various kinds of instructions on the projector 100. The operating keys included in the operating panel unit 130 include a power key for switching the turning on and off of power and a source selecting key for selecting a desired source from plural kinds of sources input via the image data input terminal 192. When the user operates (presses down) the various kinds of operating keys of the operating panel unit 130, the operating panel unit 130 accepts this input operation and outputs an operating signal according to the content of the user's operation to the control unit 120. The operating panel unit 130 realizes the function of the operating panel units $130_1$ and $130_2$. Moreover, the projector 100 includes the remote controller RC having a function similar to that of the operating panel unit 130.

To the power source unit 140, electric power of AC 100V or the like is externally supplied via the power supply terminal 144. The power source unit 140 converts, for example, an AC power supply supplied from a commercial power supply into a DC power supply at a predetermined voltage, and supplies electric power to the units of the projector 100.

To the units of the projector 100, electric power is supplied according to the operating state based on an instruction of the control unit 120. For example, in the normal operating state, the power source unit 140 supplies electric power (operating power) necessary for projecting an image to the units. In the standby state, the power source unit 140 stops the supply of the operating power and waits for an operation for turning on the power. Specifically, in the standby state, the power source unit 140 supplies electric power only to, for example, the control unit 120, the operating panel unit 130, the storage unit 132, and the infrared ray receiving unit 170, and stops the supply of electric power to the other portions.

The light source control unit 142 includes an inverter that converts direct current generated by the power source unit 140 into alternating rectangular wave current and an igniter that causes dielectric breakdown between electrodes of the light source lamp 112 to promote the start of the light source lamp 112. The light source control unit 142 controls the turn-on of the light source 111 based on an instruction of the control unit 120. Specifically, the light source control unit 142 can start the light source lamp 112 and supply predetermined electric power to thereby turn on the light source 111, and stop the supply of electric power to turn off the light source 111.

A control signal conforming to the RS-232C standard is input/output to/from the RS-232C communication unit 150 via the known RS-232C terminal 152 from the control device 40 (FIG. 1) for controlling the projector 100. The RS-232C communication unit 150 performs reception processing of a control signal input via the RS-232C terminal 152, and outputs the received result corresponding to the control signal to the control unit 120. Moreover, the RS-232C communication unit 150 outputs a control signal conforming to the RS-232C standard to the RS-232C terminal 152 based on an instruction of the control unit 120.

A signal conforming to the USB standard is input/output to/from the USB communication unit 160 via the USB terminal 162. The USB terminal 162 includes an A terminal to which an A plug shown in FIG. 3B can be connected and a B terminal to which a B plug shown in FIG. 3C can be connected. The A terminal and the B terminal each include, as shown in FIG. 3A, a VBUS, a D−, a D+, and a GND. A predetermined voltage is applied to the VBUS; a differential voltage corresponding to communication data is applied to the D− and the D+; and a predetermined ground voltage is applied to the GND. The USB communication unit 160 performs reception processing of a USB standard signal input via the USB terminal 162, and outputs the received result corresponding to the signal to the control unit 120. Moreover, the USB communication unit 160 outputs, based on an instruction of the control unit 120, a signal conforming to the USB standard to the USB terminal 162. The USB communication unit 160 realizes the function of the USB communication units $160_1$ and $160_2$ of FIG. 1 according to the operating mode set by the operating mode setting unit 122.

The VBUS of the B terminal of the USB terminal 162 is also connected to the control unit 120. The control unit 120 has also a function as a power supply detecting unit. When the projector having the control unit 120 is set to be a follower projector in the power link mode, the control unit 120 detects that a predetermined voltage is applied to the VBUS of the USB cable CB by a master projector, and thereby detects the power-on of the master projector.

The infrared ray receiving unit 170 receives a code sent from the remote controller RC with an infrared ray according to the content of a user's operation. A signal corresponding to the code received by the infrared ray receiving unit 170 is transmitted to the control unit 120. The infrared ray receiving unit 170 realizes the function of the infrared ray receiving unit $170_1$ of FIG. 1.

The operating panel unit 130, or the remote controller RC and the infrared ray receiving unit 170 correspond to an input operating unit.

The temperature sensor 184 includes a thermistor or the like, detects the temperature inside the main body of the projector 100, and outputs the detected result to the cooling control unit 182. The temperature sensor 184 is arranged at a site where heat is generated or a site susceptible to damage caused by heat, such as the light source 111, the liquid crystal light valves 114R, 114G, and 114B, or the power source unit 140. Moreover, instead of directly detecting the temperature inside the main body of the projector 100, the temperature of the air exhausted through an exhaust port of the main body of the projector 100 is detected for example, whereby the temperature inside the main body of the projector 100 may be detected indirectly.

The cooling control unit 182 controls, based on an instruction of the control unit 120, the start and stop of rotation of the cooling fan 180, and controls, based on an instruction of the control unit 120 and a detected result of the temperature sensor 184, the number of rotations (rotational speed) of the cooling fan 180. As the temperature inside the main body of the projector 100 is higher, the cooling control unit 182 increases the rotational speed of the cooling fan 180 to suppress temperature rise. Moreover, when the temperature inside the main body of the projector 100 is low, the cooling control unit 182 reduces the rotational speed of the cooling fan 180 to suppress the noises and power consumption associated with the rotation of the cooling fan 180. The cooling control unit 182 realizes the function of the cooling control units $182_1$ and $182_2$ of FIG. 1.

The cooling fan 180 includes, for example, an axial fan, a sirocco fan, or the like. The cooling fan 180 rotates based on the control of the cooling control unit 182 to thereby suck the external air through a suction port disposed in the main body to cool the inside (especially the image projecting unit 110, the power source unit 140, or the like) of the main body, and exhausts the air after cooling through the exhaust port disposed in the main body. The cooling fan 180 may include a plurality of fans. For example, the cooling fan 180 may be configured to include a suction fan arranged in the vicinity of the suction port and an exhaust fan arranged in the vicinity of the exhaust port. The cooling fan 180 realizes the function of the cooling fans $180_1$ and $180_2$ of FIG. 1.

The image data input terminal 192 includes a plurality of input terminals. Image data is input to the input terminals from an external image supply device such as a PC or a video reproduction device via a cable (not shown). The image data input to the input terminals constituting the image data input terminal 192 is supplied to the input selecting unit 194. In the embodiment, image data is input to the image data input terminal 192 from the image distribution device 30.

The input selecting unit 194 selects, based on an instruction of the control unit 120, one of the plurality of input terminals constituting the image data input terminal 192, and outputs image data input to the selected input terminal to the image processing unit 190. When the user operates the source selecting key included in the operating panel unit 130 to designate a desired input terminal, the control unit 120 instructs the input selecting unit 194 to output image data input to the input terminal to the image processing unit 190.

The image processing unit 190 converts the image data input from the input selecting unit 194 into image data representing the gray scales of the pixels of the liquid crystal light valves 114R, 114G, and 114B. Here, the converted image data are those for the respective R, G, and B color lights. The image data includes a plurality of pixel values corresponding to all of the pixels of each of the liquid crystal light valves 114R, 114G, and 114B. The pixel value specifies the light transmittance of the corresponding pixel. By the pixel value, the intensity (gray scale) of light emitted from each of the pixels is specified. Moreover, the image processing unit 190 performs, based on an instruction of the control unit 120, image quality adjustment processing or the like for adjusting brightness, contrast, sharpness, hue or the like on the converted image data, and outputs the processed image data to the OSD processing unit 196. The image processing unit 190 realizes the function of the image processing units $190_1$ and $190_2$ of FIG. 1.

The OSD processing unit 196 performs, based on an instruction of the control unit 120, processing for superimposing an OSD image such as a menu image or a message image on an input image. The OSD processing unit 196 includes an OSD memory (not shown) and stores therein image data representing a graphic, a font, or the like for forming an OSD image. When the control unit 120 instructs to superimpose an OSD image, the OSD processing unit 196 reads necessary image data from the OSD memory to generate OSD image data for forming a designated OSD image. Then, the OSD image data is combined with image data input from the image processing unit 190 so as to superimpose the OSD image on the input image at a predetermined position. The image data combined with the OSD image data is output to the liquid crystal driving unit 115. When there is no instruction from the control unit 120 to superimpose an OSD image, the OSD processing unit 196 outputs, as it is, image data input from the image processing unit 190 to the liquid crystal driving unit 115.

When the liquid crystal driving unit 115 drives the liquid crystal light valves 114R, 114G, and 114B according to the image data input from the OSD processing unit 196, the liquid crystal light valves 114R, 114G, and 114B form an image according to the image data. The image formed by the liquid crystal light valves 114R, 114G, and 114B is projected from the projection lens 116.

Figure 4:
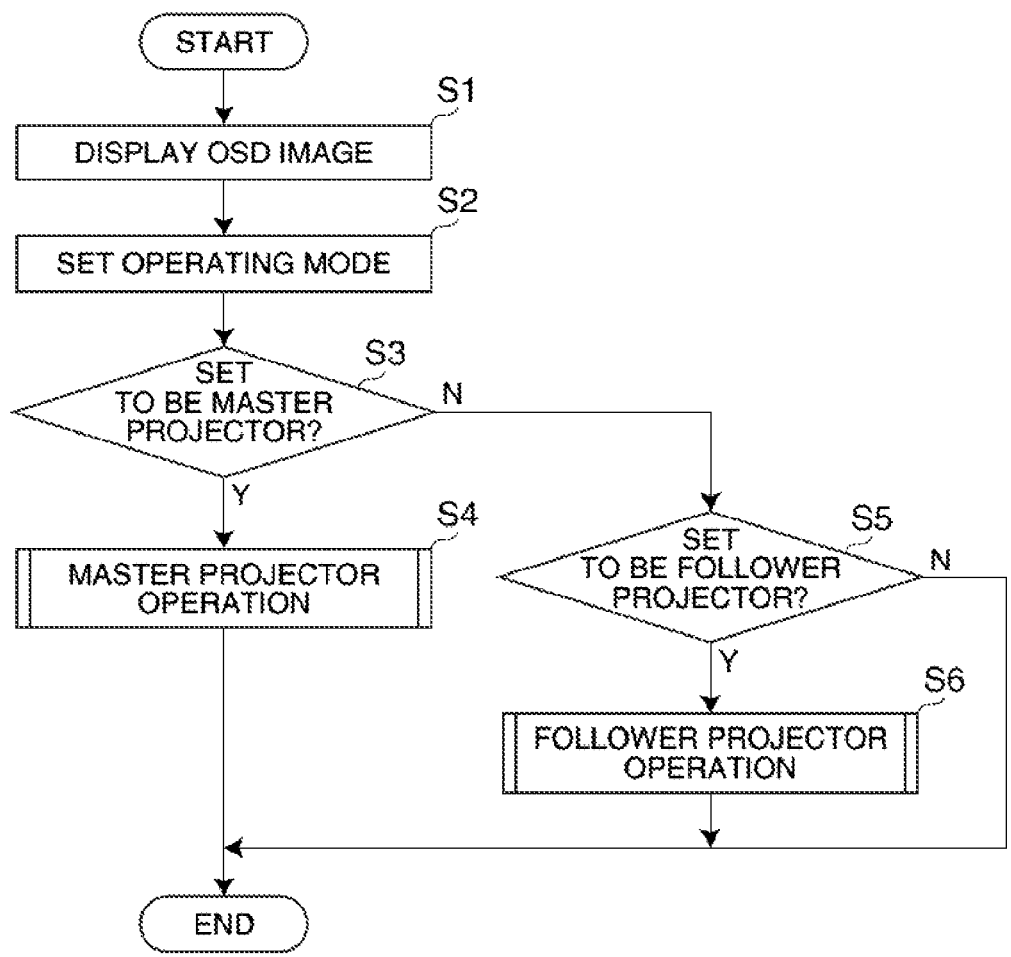
FIG. 4 is a flow diagram of a processing example of the projector in the embodiment.

FIG. 4 shows a flow diagram of a processing example of the projector 100.

Figure 5:
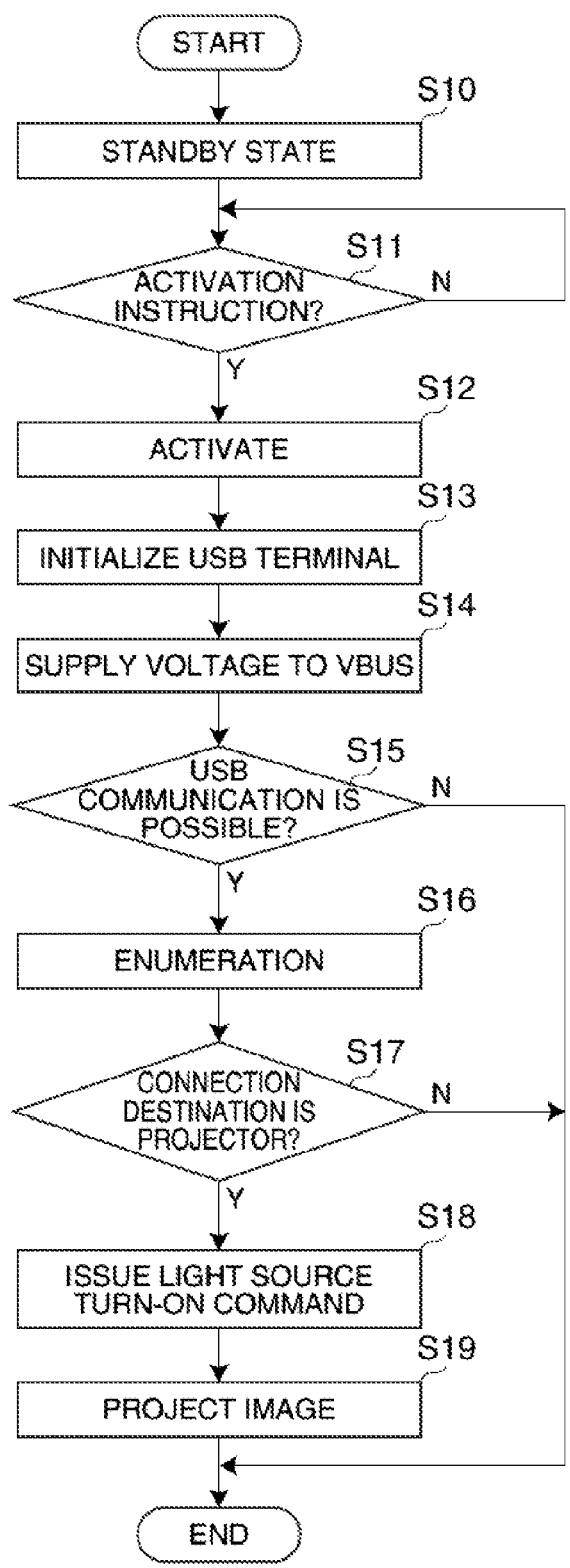
FIG. 5 is a flow diagram of a processing example in Step S4 of FIG. 4.

FIG. 5 shows a flow diagram of a processing example in Step S4 of FIG. 4.

Figure 6:
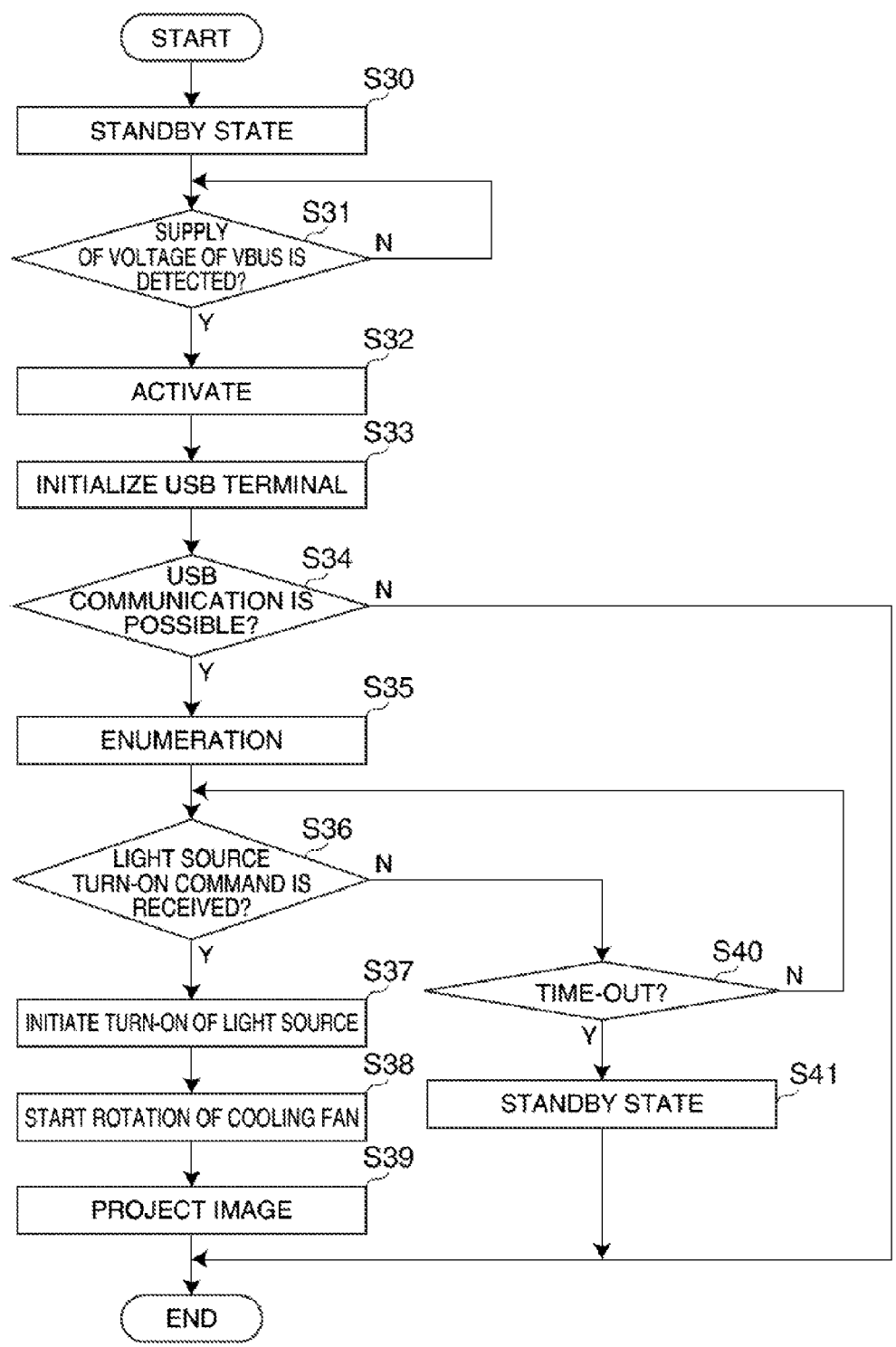
FIG. 6 is a flow diagram of a processing example in Step S6 of FIG. 4.

FIG. 6 shows a flow diagram of a processing example in Step S6 of FIG. 4.

Control programs corresponding to steps of FIGS. 4, 5, and 6 are stored in the storage unit 132. The control unit 120 reads the control program stored in the storage unit 132 to execute processing corresponding to the control program.

In the embodiment, the operating mode of the projector is designated by the user. In the case where the projector 100 is in the normal operating state, when the user operates the operating panel unit 130 or the remote controller RC to instruct to display a menu image, the control unit 120 instructs the OSD processing unit 196 to superimpose an OSD image such as the menu image on an input image. With this configuration, the projector 100 projects the OSD image onto the screen (Step S1). In the OSD image displayed in Step S1, the user can select, for example, a master projector or a follower projector in the power link mode via the operating panel unit 130 or the remote controller RC.

Next, the control unit 120 accepts the user's input operation via the operating panel unit 130 or the remote controller RC and sets, based on the user's input operation, the operating mode of the projector in the operating mode setting unit 122 (Step S2).

If it is determined that the projector is set as a master projector (set to operate in a first operating mode) by the operating mode setting unit 122 (Step S3: Y), the projector 100 operates as a master projector after this (Step S4, END). That is, the control unit 120 controls the units of the projector 100 so that the projector 100 operates as a master projector.

If it is determined that the projector is not set as a master projector (Step S3: N), the control unit 120 determines whether or not the projector is set as a follower projector (Step S5).

If it is determined that the projector is set as a follower projector (set to operate in a second operating mode) (Step S5: Y), the control unit 120 controls the units of the projector 100 so that the projector 100 operates as a follower projector after this (Step S6, END).

If it is determined in Step S5 that the projector is not set as a follower projector (Step S5: N), the control unit 120 ends a series of processing steps (END).

When the projector 100 is set to be a master projector, the projector 100 operates as shown in FIG. 5.

That is, when the projector 100 operates as a master projector, the control unit 120 sets the projector 100 into the standby state (Step S10), and waits, in a state of being connected with a follower projector, an activation instruction from the user (Step S11: N).

For example, when an activation instruction of the projector is given from the user via the remote controller RC (Step S11: Y), the control unit 120 activates the projector to, for example, the normal operating state (Step S12).

Next, the control unit 120 controls the USB communication unit 160 to initialize the USB terminal 162 (Step S13), and initiates the supply of a predetermined voltage from the power source unit 140 to the VBUS (Step S14).

Thereafter, the control unit 120 monitors, in the USB communication unit 160, whether or not USB communication is possible with a follower projector as a connection destination of the USB cable. If the USB communication is possible (Step S15: Y), the control unit 120 performs enumeration with the follower projector via the USB communication unit 160 (Step S16). In the enumeration, the master projector identifies the follower projector connected to the USB cable, and the master projector assigns an address to the follower projector. Thereafter, the master projector acquires all information (a vendor ID, a product ID, or the like) necessary for the USB communication with the follower projector.

When the enumeration ends, the control unit 120 can determine, based on the vendor ID, product ID, or the like acquired as a result of the enumeration, whether or not a connection destination of the USB cable is a projector. If the connection destination of the USB cable is determined as a projector (Step S17: Y), the control unit 120 judges that the follower projector is activated, and issues a light source turn-on command with the command issuing unit 124 (Step S18). The light source turn-on command is transmitted by the USB communication unit 160 through USB communication to the follower projector, and instructs to turn on a light source of the follower projector.

Thereafter, the control unit 120 projects, with the image projecting unit 110, an image onto the screen SCR using image data supplied from the image distribution device 30 (Step S19, END) to thereby display the image on the screen SCR in conjunction with the follower projector. In the projector 100, the turn-on of the light source and the start of cooling are performed at any point from Step S12 to Step S19.

If the USB communication is not possible in Step S15 (Step S15: N), or if the connection destination of the USB cable is determined as not a projector in Step S17 (Step S17: N), the control unit 120 ends a series of processing steps (END). Here, if the USB communication is not possible in Step S15 (Step S15: N), or if the connection destination of the USB cable is determined as not a projector in Step S17 (Step S17: N), an image may be projected (Step S19, END) onto the screen SCR using image data supplied from the image distribution device 30 as an operation of the normal mode in which the projector 100 can operate alone.

When the projector 100 is set to be a follower projector, the projector 100 operates as shown in FIG. 6.

That is, when the projector 100 operates as a follower projector, the control unit 120 sets the projector 100 into the standby state (Step S30). Then, in the USB communication unit 160, the control unit 120 detects, in a state of being connected with a master projector, the supply of voltage of the VBUS of the USB cable (Step S31: N).

If the voltage of the VBUS of the USB cable is detected, the voltage being supplied by the master projector (Step S31: Y), the control unit 120 activates the projector to, for example, the normal operating state (Step S32).

Next, the control unit 120 controls the USB communication unit 160 to initialize the USB terminal 162 (Step S33), and monitors whether or not USB communication is possible with the master projector as a connection destination of the USB cable. The control unit 120 performs the monitoring via the USB communication unit 160. If the USB communication is possible (Step S34: Y), the control unit 120 performs enumeration with the master projector via the USB communication unit 160 (Step S35).

When the enumeration ends, the control unit 120 waits for the reception of a light source turn-on command via the USB communication unit 160 (Step S36). If the light source turn-on command is received via the USB communication unit 160 (Step S36: Y), the control unit 120 initiates the turn-on of the light source 111 with the light source control unit 142 (Step S37).

Subsequently, the control unit 120 starts the rotation of the cooling fan 180 with the cooling control unit 182 (Step S38). Thereafter, the control unit 120 projects, with the image projecting unit 110, an image onto the screen SCR using image data supplied from the image distribution device 30 (Step S39, END) to thereby display the image on the screen SCR in conjunction with the master projector.

If the light source turn-on command is not received via the USB communication unit 160 in Step S36 (Step S36: N), the control unit 120 initiates the timing of a timer (not shown) and returns to Step S36 until a predetermined time-out period elapses (Step S40: N). If the predetermined time-out period elapses (Step S40: Y), the control unit 120 sets the projector 100 into the standby state (Step S41, END).

Moreover, if the USB communication is not possible in Step S34 (Step S34: N), the control unit 120 ends a series of processing steps (END). Here, if the USB communication is not possible in Step S34 (Step S34: N), the control unit 120 may set the projector 100 into the standby state (Step S41, END).

As described above, the projector 100 can operate as a master projector or a follower projector by switching the operating mode.

In the projector 100 set to be a master projector, the control unit 120 can issue, after supplying a voltage to the VBUS, a light source turn-on command instructing to turn on a light source of a follower projector via the USB cable to the follower projector that is activated by detecting the supply of the voltage to the VBUS.

In the projector 100 set to be a follower projector, the control unit 120 functions also as a power supply detecting unit and detects the supply of power via the VBUS from a master projector in the standby state. Then, when the control unit 120 detects the supply of power of the VBUS, the control unit 120 activates the projector 100 from the standby state to the normal operating state. Further, when the supply of power of the VBUS is detected, the control unit 120 determines whether or not a connection destination of the USB cable is a projector. If the connection destination is determined as not a projector, the control unit 120 can switch the projector 100 from the normal operating state to the standby state. Moreover, if the connection destination is determined as a projector, the control unit 120 can receive a light source turn-on command from the master projector and initiate the turn-on of the light source 111 with the light source control unit 142. Still further, if the connection destination is determined as a projector, the control unit 120 can start the rotation of the cooling fan 180 with the cooling control unit 182.

In the embodiment, the projector 100 of FIG. 2 is set to be a master projector as the first projector PJ1 of FIG. 1, while as the second projector PJ2 of FIG. 1, the projector 100 of FIG. 2 is set to be a follower projector. Then, one end of the USB cable is connected to the A terminal of the USB terminal of the projector set to be the master projector, while the other end of the USB cable is connected to the B terminal of the USB terminal of the projector set to be the follower projector.

Figure 7:
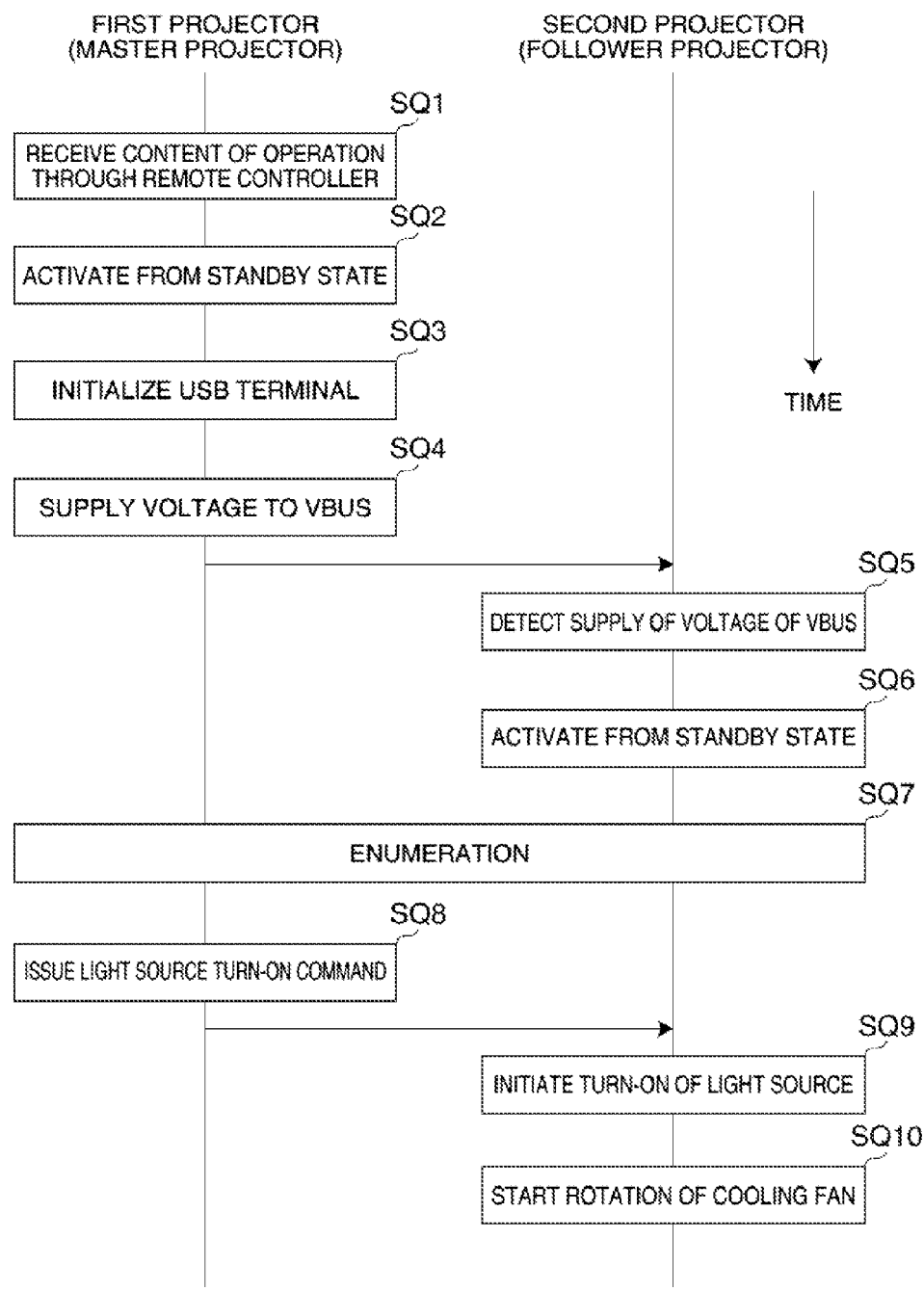
FIG. 7 shows an example of an operating sequence of the projector system in the embodiment.

FIG. 7 shows an example of an operating sequence of the projector system in the embodiment. Here, it is assumed that the operating modes of the first projector PJ1 and the second projector PJ2 have already been set as described above, and that the projectors wait in the standby state.

In the first projector PJ1, when the user operates the power key of the remote controller to instruct to power on, a code corresponding to the content of the remote controller's operation is received in the infrared ray receiving unit (Step SQ1). Then, the first projector PJ1 is activated from the standby state (Step SQ2), initializes the USB terminal (Step SQ3), and then initiates the supply of a predetermined voltage to the VBUS of the USB standard A terminal (Step SQ4).

When the supply of voltage of the VBUS of the B terminal via the USB cable is detected in the standby state (Step SQ5), the second projector PJ2 is activated from the standby state (Step SQ6). Thereafter, the first projector PJ1 and the second projector PJ2 that are activated from the standby state mutually perform enumeration via the USB cable (Step SQ7).

Then, when it is judged as a result of the enumeration that the projectors are connected to each other, the first projector PJ1 issues a light source turn-on command to the second projector PJ2 via the USB cable (Step SQ8).

The second projector PJ2 that receives the light source turn-on command initiates the turn-on of the light source (Step SQ9), and subsequently starts the rotation of the cooling fan (Step SQ10).

Figure 8:
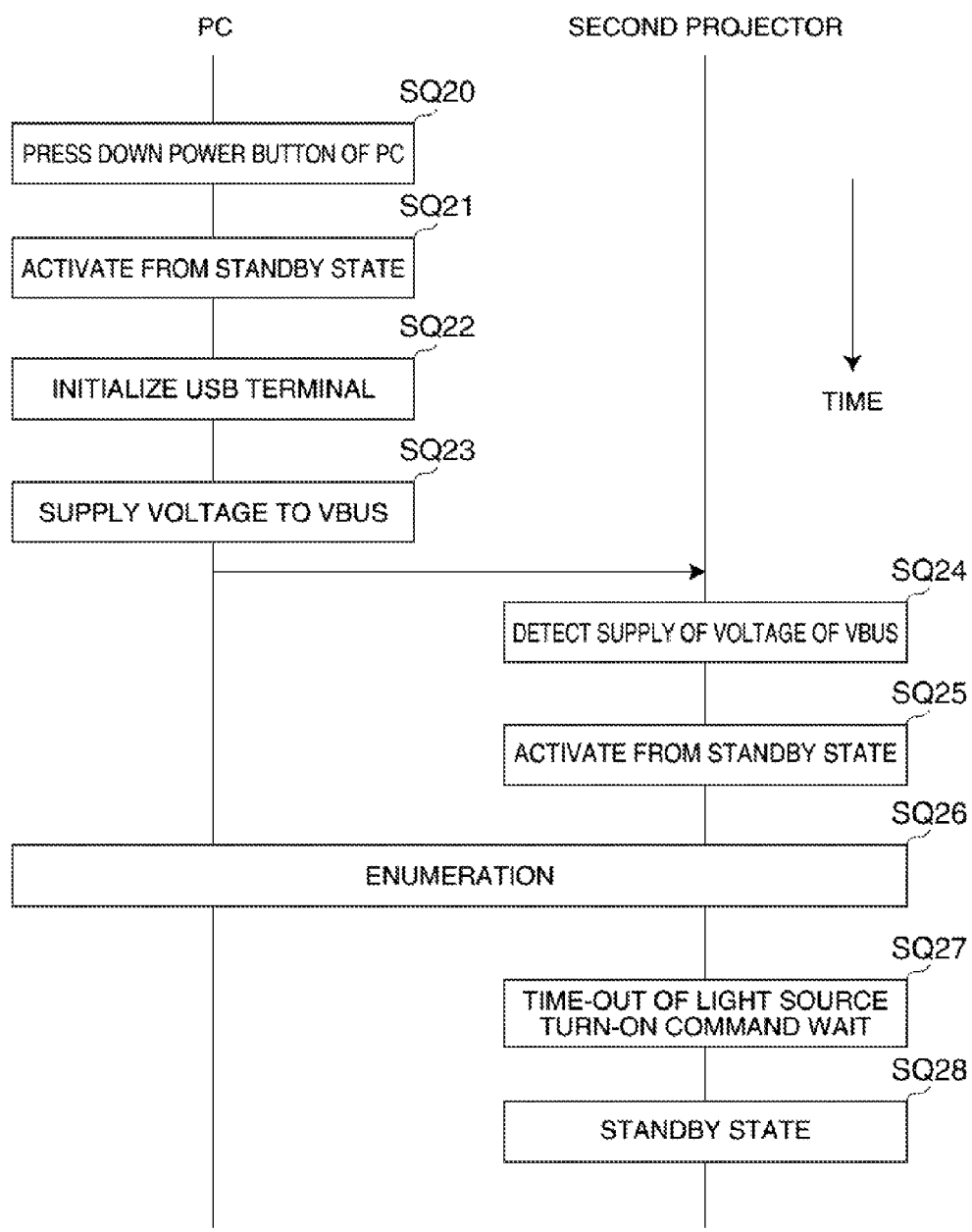
FIG. 8 shows another example of an operating sequence of the projector system in the embodiment.

FIG. 8 shows another example of an operating sequence of the projector system in the embodiment. Here, it is assumed that a PC and the second projector PJ2 are connected, and that the second projector waits in the standby state.

When the user powers on the PC (Step SQ20), the PC is activated from, for example, the standby state (Step SQ21), initializes a USB terminal (Step SQ22), and then initiates the supply of a predetermined voltage to a VBUS of a USB standard A terminal (Step SQ23).

If the supply of voltage of the VBUS of the B terminal via the USB cable is detected in the standby state (Step SQ24), the second projector PJ2 is activated from the standby state (Step SQ5). Thereafter, the PC and the second projector PJ2 that are activated from the standby state mutually perform enumeration via the USB cable (Step SQ26).

Then, if it is judged as a result of the enumeration that a projector is not connected, the second projector PJ2 waits for the reception of a light source turn-on command, and when a time-out occurs (Step SQ27), the second projector PJ2 returns again to the standby state (Step SQ28).

According to the embodiment as has been described above, a plurality of projectors can be activated in conjunction with each other without occupying a terminal that the projectors each include for control. Accordingly, in the projector system in the embodiment, the control of each of the projectors can be subsequently performed via the terminal for control, and in addition, the power-on of the projector is linked with that of another projector, so that a projector system that is easy to use for the user can be provided. In this case, it is sufficient for the projectors to wait in the standby state before activation. Therefore, there is no need to wait for a power-on command form the other side in a state where USB communication is possible, which can considerably reduce standby power.

Moreover, according to the embodiment, the second projector PJ2 as a follower projector can determine, after the second projector PJ2 is activated from the standby state, whether or not a connection destination of the USB cable CB is a projector. By doing this, if the connection destination is determined as not a projector, the second projector PJ2 can return again to the standby state. This eliminates the case where the projector remains activated for a long time as the normal operating state even when a proper operation cannot be expected as a projector system, so that unnecessary standby power of the projector can be reduced.

Moreover, the user can judge the activation of a projector based on the turn-on of a light source, the rotation of a cooling fan, the turn-on of an LED, or the like. Therefore in the embodiment, when a voltage of the VBUS is detected, the second projector PJ2 can be activated to the normal operating state in a state where the light source of the image projecting unit $110_2$ is not turned on and the rotation of the cooling fan $180_2$ is stopped. That is, when a voltage of the VBUS is detected, it is desirable that the second projector PJ2 is activated with the light source and the cooling fan remaining in the standby state. By doing this, if the connection destination of the USB cable CB is determined as not a projector and the second projector PJ2 returns to the standby state, it is possible to avoid a situation where unnecessary power is consumed or unnecessary control is performed such as turning off the light source again and stopping the rotation of the cooling fan. Moreover, it is also possible to avoid a situation where the user feels uneasy because the turn-on and turn-off of the light source or the start and stop of rotation of the cooling fan are successively performed.

Modified Example

An example has been described in which the projector system 10 in the embodiment includes the first projector PJ1 and the second projector PJ2 where one of them is set as a master projector and the other is set as a follower projector. However, the invention is not limited to this.

Figure 9:
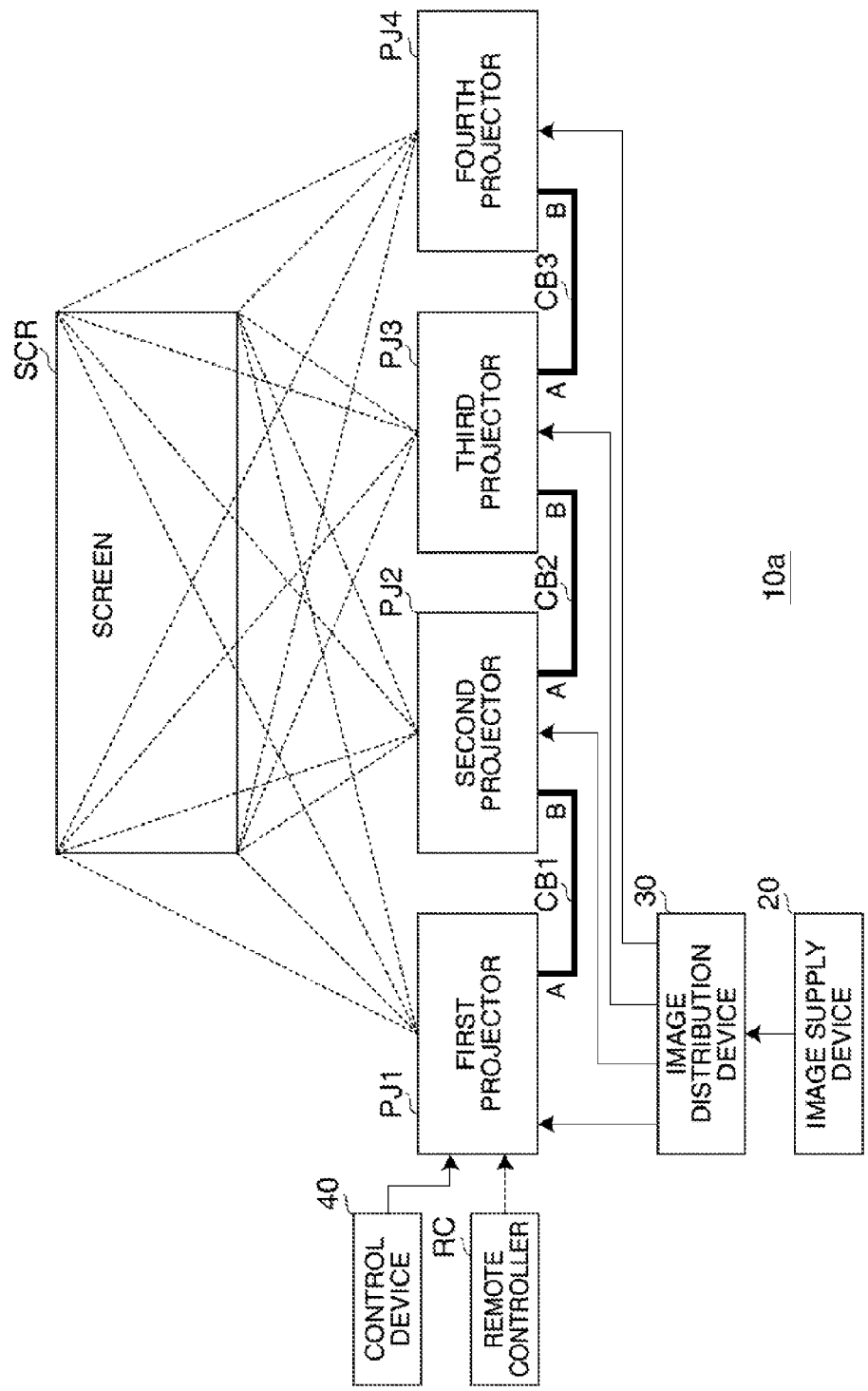
FIG. 9 is a block diagram of a configuration example of a projector system in a modified example of the embodiment.

FIG. 9 shows a block diagram of a configuration example of a projector system in a modified example of the embodiment. In FIG. 9, portions similar to those of FIG. 1 are denoted by the same reference numerals and signs, and the descriptions thereof are appropriately omitted.

The projector system 10a in the modified example includes the first projector PJ1, the second projector PJ2, a third projector PJ3, and a fourth projector PJ4. The function of each of the first projector PJ1, the second projector PJ2, the third projector PJ3, and the fourth projector PJ4 is realized by the projector 100 shown in FIG. 2.

The USB standard A terminal of the first projector PJ1 and the USB standard B terminal of the second projector PJ2 are connected via a first USB cable CB1. A USB standard A terminal of the second projector PJ2 and a USB standard B terminal of the third projector PJ3 are connected via a second USB cable CB2. A USB standard A terminal of the third projector PJ3 and a USB standard B terminal of the fourth projector PJ4 are connected via a third USB cable CB3.

For example, the first projector PJ1 is set to be a master projector, while the second projector PJ2, the third projector PJ3, and the fourth projector PJ4 are each set to be a follower projector.

When the projector 100 is set into the normal operating state by being powered on, the projector 100 initiates the supply of a predetermined voltage to the VBUS of the USB standard A terminal. Therefore, when the power key is operated through the remote controller RC, the first projector PJ1 is activated, and the supply of the predetermined voltage to the VBUS of the USB standard A terminal is initiated. The supply of the voltage is detected at the USB standard B terminal of the second projector PJ2, so that the second projector PJ2 can be activated in conjunction with the first projector PJ1.

When the second projector PJ2 is activated, the supply of the predetermined voltage to the VBUS of the USB standard A terminal of the second projector PJ2 is initiated. The supply of the voltage is detected at the USB standard B terminal of the third projector PJ3, so that the third projector PJ3 can be activated in conjunction with the second projector PJ2.

When the third projector PJ3 is activated, the supply of the predetermined voltage to a VBUS of the USB standard A terminal of the third projector PJ3 is initiated. The supply of the voltage is detected at the USB standard B terminal of the fourth projector PJ4, so that the fourth projector PJ4 can be activated in conjunction with the third projector PJ3.

According to the modified example as has been described above, in a projector system including a plurality of projectors that are connected in a daisy chain fashion, the activation of the projector can be linked with that of another projector. Accordingly, without occupying a terminal for control of each of the projectors, the projectors can be activated in conjunction with each other by power-on with low power consumption.

The projector, the projector system, and the like according to the invention have been described above based on the embodiment or the modified example thereof. However, the invention is not limited to the embodiment or the modified example thereof. For example, the invention can be implemented in various aspects within a range not departing from the scope thereof, and the following modifications are also possible.

(1) In the embodiment or the modified example thereof, an example has been described in which the projectors constituting the projector system project projection images by superimposing them on each other on the screen. However, the invention is not limited to this. The projectors constituting the projector system according to the invention may perform tiling display or 3D display on the screen.

When 3D display is performed, the image distribution device 30 generates, as image data for the first projector PJ1 for example, image data corresponding to one of a left-eye image and a right-eye image for 3D display, and supplies the image data to the first projector PJ1. Then, the image distribution device 30 generates, as image data for the second projector PJ2, image data corresponding to the other of the left-eye image and the right-eye image, and supplies the image data to the second projector PJ2.

(2) In the embodiment or the modified example thereof, an example has been described in which the image supply device and the image distribution device 30 are disposed independently of each other. However, the invention is not limited to this. The image supply device 20 may include the function of the image distribution device 30. Moreover, the control device 40 may include the function of at least one of the image supply device 20 and the image distribution device 30.

(3) In the embodiment or the modified example thereof, a description has been given in which a follower projector that receives a light source turn-on command initiates the turn-on of the light source and then starts the rotation of the cooling fan. However, the invention is not limited to this. For example, after receiving a light source turn-on command, a follower projector may start the rotation of the cooling fan and then initiate the turn-on of the light source. In this case, a master projector may issue not a light source turn-on command but a cooling-fan rotation start command to the follower projector.

(4) In the embodiment or the modified example thereof, a description has been given in which a follower projector determines whether or not a connection destination of the USB cable is a projector, and based on the determined result, the follower projector returns to the standby state, or initiates the turn-on of the light source or starts the rotation of the cooling fan. However, the invention is not limited to this. For example, also a master projector may determine whether or not a connection destination of the USB cable is a projector, and if the connection destination is determined as not a projector, the master projector may return to the standby state. Moreover, if the connection destination of the USB cable is determined as a projector, the master projector may initiate the turn-on of the light source or start the rotation of the cooling fan.

(5) In the modified example, the projector system including four projectors has been described by way of example. However, the invention is not limited to this. For example, the invention can also be applied to a projector system including three projectors or a projector system including five or more projectors.

(6) In the embodiment or the modified example thereof, a three-plate type projector using the three liquid crystal light valves 114R, 114G, and 114B as a light modulating device has been described by way of example. However, the invention is not limited to this. For example, the invention can be implemented as an aspect in which an image is formed by one liquid crystal light valve including sub-pixels that can respectively transmit R light, G light, and B light in each pixel.

(7) In the embodiment or the modified example thereof, the transmissive liquid crystal light valves 114R, 114G, and 114B are used as a light modulating device. However, a reflective light modulating device such as a reflective liquid crystal light valve can also be used. Moreover, a minute mirror array device or the like that controls the exiting direction of incident light on each micromirror as a pixel to thereby modulate light emitted from a light source can also be used.

(8) In the embodiment or the modified example thereof, the light source 111 includes the discharge-type light source lamp 112. However, the light source 111 may be a solid-state light source such as an LED (Light Emitting Diode) light source, a laser light source, or a light source having another configuration.

(9) In the embodiment or the modified example thereof, the invention has been described as a projector, a projector system, and the like. However, the invention is not limited to them. For example, the invention may be a program that describes a control method of the projector according to the invention or a processing procedure of a control method of the projector system, and a recording medium on which the program is recorded.

The entire disclosure of Japanese Patent Application Nos. 2012-63244, filed Mar. 21, 2012 and 2012-277751, filed Dec. 20, 2012 are expressly incorporated by reference herein.

What is claimed is:

1. A projector configured to be able to connect with an other projector via a communication cable including a power line, comprising:
   an image projecting unit that modulates light emitted from a light source and projects the light;
   a power supply detecting unit that detects, in a standby state, the supply of power via the power line from the other projector; and
   a control unit that performs control to switch an operating state of the projector between the standby state and a normal operating state,
   wherein,
      when the supply of power of the power line is detected by the power supply detecting unit, the control unit is activated from the standby state to the normal operating state, and
      the control unit determines whether or not a connection destination of the communication cable is a projector when the supply of power of the power line is detected by the power supply detecting unit, and when the connection destination is determined to not be a projector, the control unit switches the operating state from the normal operating state to the standby state.

2. The projector according to claim 1, further comprising:
   an input operating unit that accepts an input operation; and
   a power source unit that supplies power to the power line, wherein
   in the case where the operating mode of the projector is set to a first operating mode via the input operating unit, the control unit issues a light source turn-on command instructing to turn on a light source of the other projector via the communication cable after the power source unit supplies power to the power line.

3. The projector according to claim 2, wherein
   in the case where the operating mode of the projector is set to a second operating mode via the input operating unit, the control unit is activated from the standby state to the normal operating state when the supply of power of the power line is detected by the power supply detecting unit.

4. The projector according to claim 1, further comprising a light source control unit that controls the turn-on of the light source, wherein
   if the connection destination is determined as a projector, the control unit accepts a light source turn-on command from the other projector and initiates the turn-on of the light source with the light source control unit.

5. The projector according to claim 1, further comprising:
   a cooling fan that cools the image projecting unit; and
   a cooling control unit that controls the operation of the cooling fan, wherein
   if the connection destination is determined as a projector, the control unit starts the rotation of the cooling fan with the cooling control unit.

6. The projector according to claim 1, wherein
   the communication cable is a USB cable, and
   the power line is a USB standard VBUS.

7. The projector according to claim 1, the projector being configured to be able to connect with a plurality of other projectors including a first other projector and a second other projector, further comprising:
   a power source unit that supplies power to the power line, wherein
      the power supply detecting unit detects, in a standby state, the supply of power via the power line from the first other projector, and
      power is supplied to the power line to thereby notify the second other projector that the projector is powered on.

8. The projector according to claim 7, further comprising a control unit that issues, to the second other projector activated by detecting the supply of power to the power line, a light source turn-on command instructing to turn on a light source of the second other projector via the communication cable.

9. A projector system comprising a first projector and a second projector that are connected via a communication cable including a power line,
   the first projector comprising:
      an image projecting unit that modulates light emitted from a light source and projects the light;
      a power supply detecting unit that detects, in a standby state, the supply of power via the power line from the second projector; and
      a control unit that performs control to switch an operating state of the projector between the standby state and a normal operating state,
      wherein,
         when the supply of power of the power line is detected by the power supply detecting unit, the control unit is activated from the standby state to the normal operating state, and
         the control unit determines whether or not a connection destination of the communication cable is a projector when the supply of power of the power line is detected by the power supply detecting unit, and when the connection destination is determined to not be a projector, the control unit switches the operating state from the normal operating state to the standby state, and
   the second projector comprising:
      an image projecting unit that modulates light emitted from a light source and projects the light; and
      a power source unit that supplies power to the power line,
      wherein, power is supplied to the power line to thereby notify the first projector that the projector is powered on.

* * * * *